Feb. 7, 1928.
E. HALL
1,658,767
SPEED REDUCTION GEAR
Filed Jan. 6, 1922
2 Sheets-Sheet 1
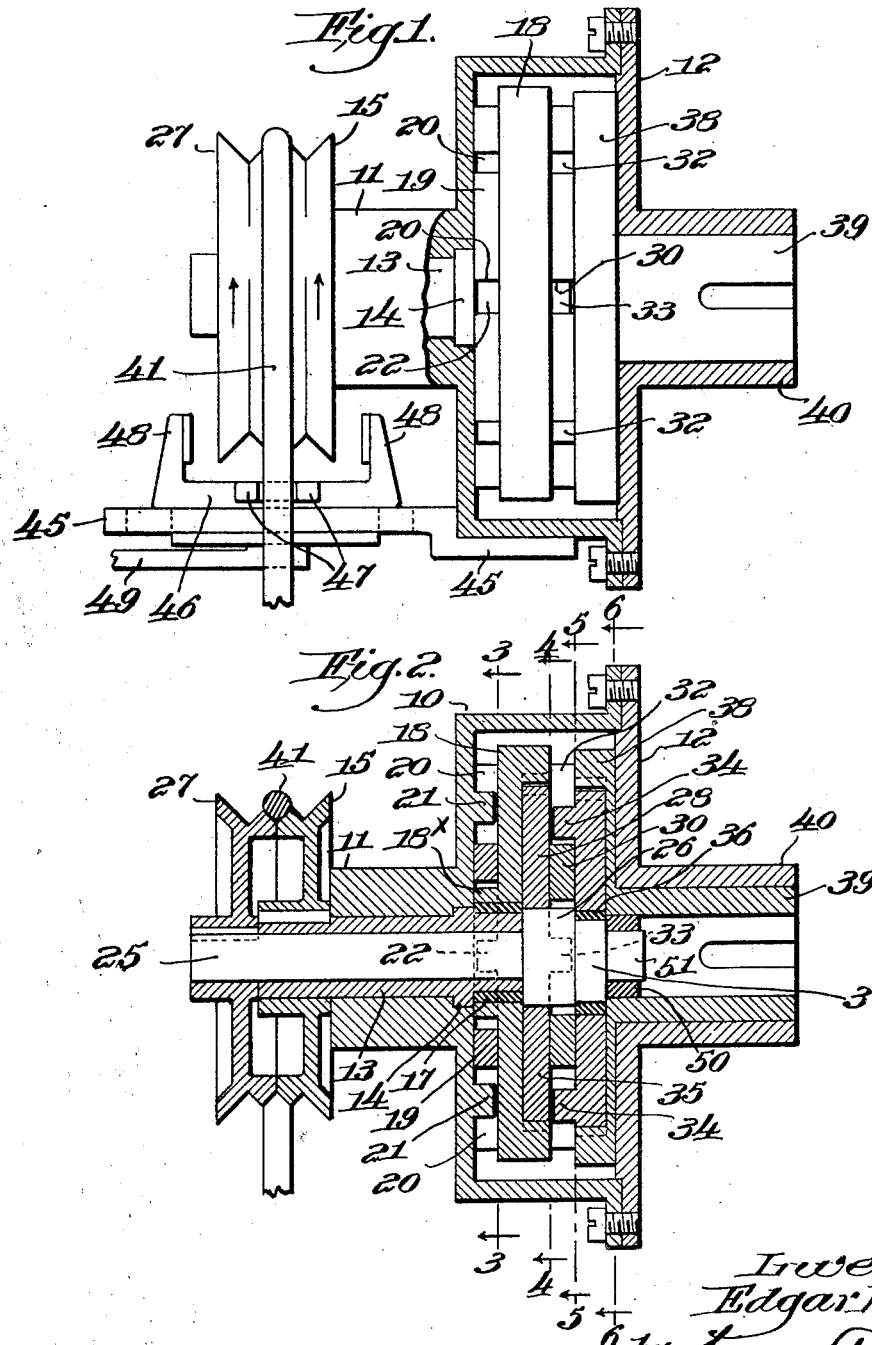
Inventor:
Edgar Hall,
by Edward F. Allen.
his Atty.

Patented Feb. 7, 1928.

1,658,767

UNITED STATES PATENT OFFICE.

EDGAR HALL, OF CAMBRIDGE, MASSACHUSETTS.

SPEED-REDUCTION GEAR.

Application filed January 6, 1922. Serial No. 527,289.

This invention relates to a speed reduction gear and more particularly to one of this class that may be used in connection with devices of various sorts wherein change of direction of rotation is frequently called for.

It is an object of this invention to produce a compact and simple structure that carries a nicety of balance and therefore the elimination of vibration to the minimum.

It is a further object of the invention to produce a gear that may be rapidly changed as to its direction of rotation whereby it is especially applicable to elevators, clothes wringers and the like.

It is a still further object of the invention to make the gear reversible by a slight shift of the driving element which preferably is one that drives continuously in one direction.

Another object of the invention is to produce a reduction gear, the driving element of which may be and preferably is moving continuously in one direction, of such arrangement that certain portions of it may be driven without imparting driving movement to the driven element.

Another object of the invention is to produce a speed reduction gear wherein both power transmitting members may be driven in opposite directions at the same time to thereby attain a speed of the driven element double that attained when only one of the power transmitting members is actuated.

A further object of the invention is to so arrange the reduction gear in an enclosed casing in such manner that the said casing may perform the duties of a pulley to which forward and reverse rotations may be given at will if desired.

To accomplish this last mentioned object a few slight changes from that herein shown would be required but which are merely minor ones.

The invention consists in certain features of construction and particularly in arrangement of parts to produce results not heretofore known to have been attained in reduction gears of this class, which will be fully understood from a description of the drawings and the claims hereinafter given.

Of the drawings:

Figure 1 represents one form of reduction gear in side elevation, partially broken away, embodying the invention.

Figure 2 a vertical longitudinal section of the gear, the belt shipper and brake device being omitted.

Figure 3:
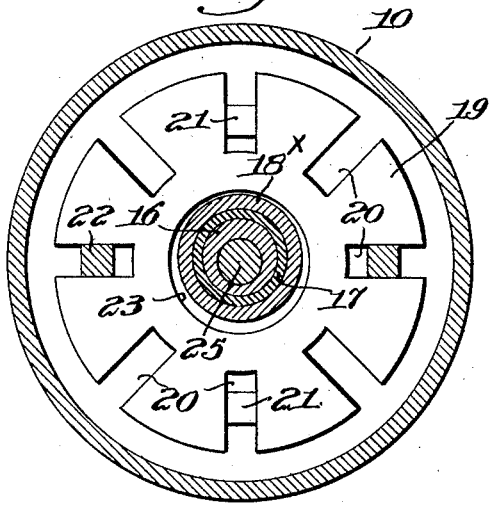

Figure 3 a section on the line 3—3 Figure 2.

Figure 4:
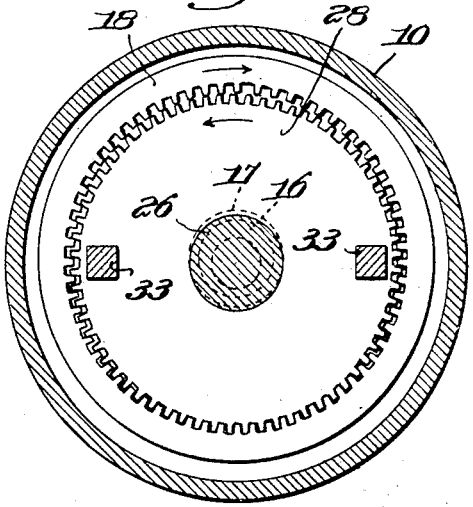

Figure 4 a section on the line 4—4 Figure 2.

Figure 5:
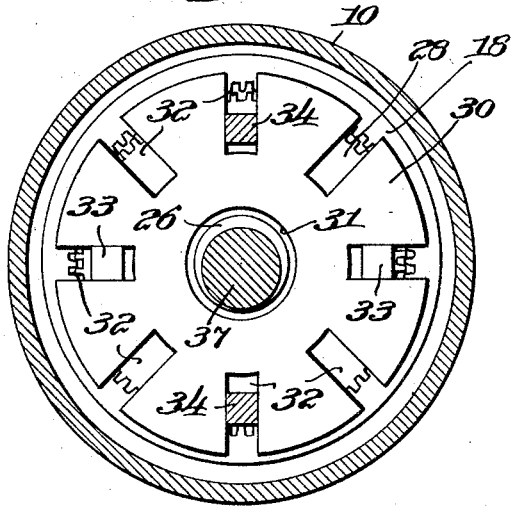

Figure 5 a section on the line 5—5 Figure 2.

Figure 6:
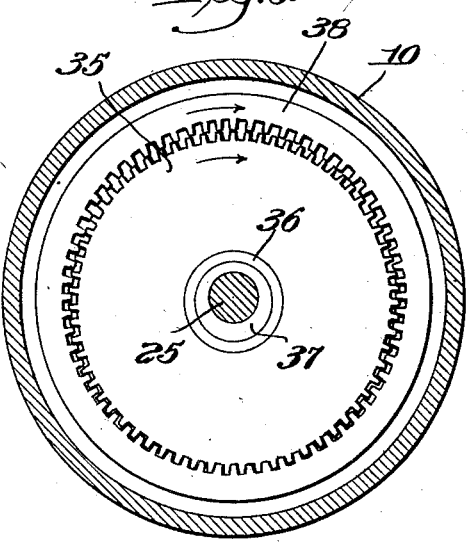

Figure 6 a section approximately on the line 6—6 Fig. 2.

Like characters designate like parts throughout the several figures of the drawings.

Referring to the drawings:

The drawings herewith show an arrangement of the reduction gear wherein the relatively stationary enclosing casing thereof affords bearings for the driving and driven elements. While this is the preferred form the gear is of such character as to permit of the use of the casing as a pulley, if desired, by securing the driven element from rotation, and making one or two minor changes which will be hereinafter referred to.

For the purpose of explanation let it be considered that the casing 10 having the hub or bearing 11 and the removable cap 12 is relatively fixed with the machine or device to which power is to be supplied.

Journalled in the hub or bearing 11 is a sleeve shaft 13 held from longitudinal movement therein by the collar 14 and the pulley 15 fast thereto. Said sleeve having an eccentric 16 at the right end thereof, see Figure 2, which is surrounded by a hardened bushing 17 fast in the hub 18× of an internal gear 18. Rotation of sleeve 13 imparting a bodily circular, non-rotative movement to said gear 18, said movement being attained by means of a floating plate or disk 19, having a series of slots 20 therein, two of which are engaged by lugs 21 extending from the stationary case 10 and two others 22 extending from the gear 18. It will thus be seen that as the plate 19 is held from rotation by the lugs 21, the gear 18 must partake of an orbital path which is made possible by reason of the plate 19, having slidable connection with the lugs 21, and the lugs 22 slidably engaging other slots of the said plate. The said plate 19 has a central opening 23 therein of a size sufficient to permit freedom of movement between it and the hub 18× of the gear 18 which it surrounds.

Journalled in the sleeve 13 is a shaft 25 and held from longitudinal movement therein by means of the enlarged collar 26 at the right end thereof, see Figure 2, and the pulley 27 secured at the left end thereof.

Surrounding a portion of the collar 26 and having a running fit therewith is a spur gear 28, some of the teeth of which are in engagement with teeth of the internal gear 18, the engaging teeth however changing as the gear 18 moves in its orbital path.

In the present instance it is desired to reduce the speed from the source of power to the driven element to the approximate ratio of 66 to 1 or 66 revolutions of the pulleys 15 and 27 to 1, more or less, of the driven member or element 39 to be later referred to.

To accomplish this result the internal gear 18 has 66 teeth while the spur gear 28 adapted to mesh therewith has 65 teeth, consequently 66 complete orbital movements of gear 18 will cause one complete revolution and one tooth more of gear 28 but in a direction opposite to that of the pulley 15 or orbital movement of gear 18, which in this instance is clockwise. Before describing the transmission of power from the rotating gear 28 to the driven element, the parts therebetween will be described.

Loosely surrounding the collar 26 of the shaft 25 is a plate or disk 30 similar to the disk 19, said disk 30 having a central opening 31 of sufficient size to permit said disk to move the required amount without interfering with said collar 26.

Disk 30 is also provided with radial notches or slots 32, two of which are engaged with lugs 33 extending from the gear 28 while two others are engaged with lugs 34 extending from a gear 35 which is the same size and has same number of teeth as gear 28. Said gear 35 has a central opening into which is pressed a bushing 36 which in turn surrounds an eccentric 37 forming part of the shaft 25.

Meshing with gear 35 is an internal gear 38 of the same size and number of teeth as gear 18, said gear 38 having a sleeve extension 39 concentric therewith which is journalled in the hub 40 of the cap 12.

If so desired the sleeve 39 may be a solid shaft but for some purposes the sleeve is desirable, and is, in this instance, the driven element heretofore referred to. The sleeve extension conveniently offers an opportunity for the hardened bushing 50 to be pressed therein to form a bearing for that end 51 of the shaft 25.

Again referring to the rotating gear 28, which derives its movement from the orbital movement of gear 18, its rotation is imparted to the disk 30 through the lugs 33 and from said disk to the gear 35 through the lugs 34 thence to gear 38 and driven element 39 in counter clockwise direction.

As it is an object of this invention to produce a reducing gear the driven element of which may be rotated first in one direction and then the reverse as often and as rapidly as desired, the means for causing a reverse rotation will now be further explained.

Assuming as before mentioned that the driving element herein shown as a belt 41 is arranged to drive pulleys 15 and 27 alternately as desired in clockwise direction and that it is now desired to reverse the direction of rotation of the driven element 39 from that above explained.

The belt 41 will be shifted from its supposed position on pulley 15 to pulley 27 and impart clockwise rotation thereto.

The eccentric 37 will be turned and cause orbital movement to the spur gear 35 which meshes with gear 38 but in this instance causes said gear 38 and attached hub 39 to rotate in the same direction or clockwise.

When driving through pulley 27 it will be understood that the pulley 15 is held from movement and consequently the gears 18 and 28 are likewise quiescent and because of this fact the plate or disk 30 is held from rotation by the lugs 33 but free to slide thereon to impart the orbital movement to the gear 35 in conjunction with the eccentric 37.

For convenience let it be understood that the clockwise movement of the sleeve 39, when pulley 27 is being driven, is the preferred direction of drive and the counter clockwise movement thereof, when pulley 15 is driven, is a reverse movement thereof. The drawings herewith show two pulleys 15 and 27, both fast with their respective transmitting mediums, and so arranged as to be driven separately or both together.

The action resulting from driving each of the pulleys separately has been described and as it may be advisable in some instances to keep certain of the parts moving and ready for instant action while the driven element 39 is quiescent, the present device is arranged to drive both of the pulleys in the same direction at the same time and not impart motion to the driven element 39.

As before explained, when pulley 15 was driven the driving element 39 was rotated counter clockwise and when pulley 27 was driven the said element was rotated clockwise, hence when both pulleys are driven together the action of each is neutralized by the other and consequently there is no movement imparted to the driven element 39.

While the drawings show the driving elements as a belt 41 it is obvious that other means may be employed to cause a shift of the driving power from the sleeve 13 to the shaft 25 and vice versa, or to drive both the sleeve and shaft if desired.

It is therefore not the intention to limit this invention to the use of a belt as a driving element but rather to claim broadly a driving element capable of engaging either the shaft or sleeve or both, and in another application show and claim more specific means for the same purpose.

For the purpose of illustration a simple means for shipping the belt 41 is herein shown having a brake device connected therewith.

Fast to the case 10 is a bracket 45 so arranged as to slidingly guide the shipper 46 which has the belt engaging fingers 47 projecting therefrom and the upwardly extending brake members 48. The said shipper may be operated in any suitable manner, as for instance by a manually controlled lever 49, a portion of which is shown in Figure 1.

It will be understood that if desired the shipper may be supplied with means to temporarily lock it in either of the three positions it is designed to assume.

It is obvious that movement of the shipper to the left will transfer the belt from its neutral position to the pulley 27 and simultaneously the brake member at the right will engage and stop the pulley 15 and retain it in such condition until another change has been made.

Obviously shifting the shipper from its neutral position or from pulley 27 to pulley 15 will cause movement of that pulley and stoppage of pulley 27 by reason of the brake action thereon.

Ordinarily, the use of the brake mechanism as above explained would not be necessary providing, of course, that the gear was kept in a fair state of lubrication and the load not greater than the driving power was capable of handling.

In practice it has been found that the brakes may be dispensed with, but it is preferred that they be used to obviate the possibility of improper action of the gear.

The uses to which this invention may be applied are very numerous and therefore the ratio of speed may be changed to suit the occasion and it will also be understood that it is not the intention to limit the invention to the precise construction and arrangement herein shown and described as it is obvious that the same might be changed without departing from its spirit and scope.

With this arrangement the direction of rotation of the case 10 would be the reverse of that of the element 39 under the same driving condition.

It is not known that a speed reducing gear such as above described has ever been in use, wherein a driving element continuously rotating in one direction may be shifted to cause rotation of a driven element to be changed from forward to reverse or vice versa.

Having described the invention I claim:

1. A speed reducing mechanism of the class described, having in combination, two internal gears; means for holding one of said internal gears against rotating on its own axis but with provision for universal edgewise movement thereof; two spur gears each disposed within and meshing with one of said internal gears; means interlocking said spur gears so as to hold them against relative rotative movement but with provision for universal edgewise movement relatively; an eccentric for moving in an orbital path the internal gear that is held against rotation on its own axis; an eccentric for moving in an orbital path the spur gear that engages the other internal gear; a drive element that is continuously operated in one direction, and power transmitting means through which said driving member rotates said eccentrics, and with relation to which the driving member is adjustable to selectively operate said eccentrics.

2. A speed reducing mechanism of the class described constructed in accordance with claim 1 and wherein said driving member is adjustable relatively to said power transmitting means to selectively operate said eccentrics or to simultaneously operate both eccentrics.

3. In a speed reducing mechanism of the class described the combination of a driving member continuously operating in one direction; a power transmitting mechanism with which said driving member co-operates including a spur gear supported to rotate on a fixed axis; an internal gear meshing with said spur gear and held against rotating upon its own axis but bodily movable in an orbital path concentric with the axis of said spur gear to rotate the latter on its axis at relatively low speed; a driven member; a second power transmitting mechanism including a train of gearing through which said spur gear rotates the driven member in one direction when the driving member is connected with said first power transmitting mechanism, and including also means through which said driving member may be connected with said train of gearing independently of said first power transmitting mechanism to rotate the driven member in the opposite direction.

4. In a speed reducing gear of the class described, a shiftable driving element moving continuously in one direction; a driven element; power transmitting mechanism including an eccentric rotated by said driving element; two connected trains of gears through which said eccentric rotates said driven element in one direction; a second power transmitting mechanism also including an eccentric adapted to be rotated by said driving element; and operating through one of said trains of gears to rotate said driven element in a reverse direction; and means whereby each of said power transmitting mediums and coacting gear trains may control the direction of rotation of said driven element.

5. In a speed reducing gear of the class described, a shiftable driving element moving continuously in one direction; a driven element adapted to have its direction of rotation reversed; a shaft having an eccentric thereon adapted to rotate in the same direction as said driving element; an internal gear actuated by said eccentric but in a non-rotatable manner; a spur gear concentric with said shaft meshing with said internal gear and transmitting rotation to said driven member in one direction; a second shaft having an eccentric thereon adapted to rotate in the same direction as said driving element; a spur gear actuated by said eccentric in a non-rotatable manner; and a second internal gear concentric with said shafts meshing with said second spur gear and transmitting rotation to said driven element in an opposite direction.

6. In a speed reducing gear of the class described, a shiftable driving element moving continuously in one direction; a driven element; a gear train; a shaft having an eccentric thereon adapted to actuate said gear train to rotate said driven element in one direction upon rotation of said shaft by said driving element; a second gear train; a second shaft having an eccentric thereon adapted to actuate said second gear train to rotate said driven element in an opposite direction to said first gear train upon rotation of said second shaft by said driving element; and means whereby both shafts may be rotated to cause actuation of certain portions of said gear trains and not others whereby said driven shaft remains at rest.

Signed by me at Boston, Mass., this 29th day of December, 1921.

EDGAR HALL.